Figure 1:
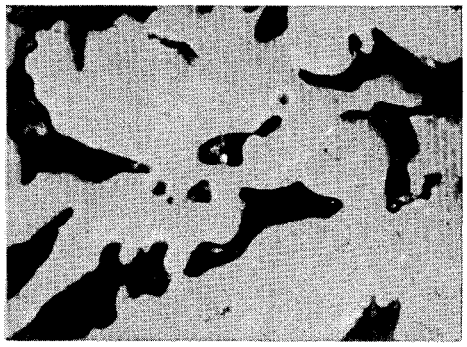

United States Patent

[11] 3,597,664

| [72] | Inventor | Gerard J. Villani<br>Needham, Mass. |
|---|---|---|
| [21] | Appl. No. | 882,482 |
| [22] | Filed | Dec. 5, 1969 |
| [45] | Patented | Aug. 3, 1971 |
| [73] | Assignee | Norton Company<br>Worcester, Mass. |

[54] NIOBIUM-ZIRCONIUM-TITANIUM CAPACITOR ELECTRODE
10 Claims, 11 Drawing Figs.

[52] U.S. Cl. .................................................... 317/230, 29/570
[51] Int. Cl. ...................................................... H01g 9/05
[50] Field of Search .......................................... 317/230, 231, 233, 258

[56] References Cited
UNITED STATES PATENTS

| 3,126,503 | 3/1964 | Salomon.................... | 317/230 |
| 3,410,766 | 11/1968 | Schmidt ...................... | 317/230 |
| 3,531,382 | 9/1970 | West ............................ | 317/230 X |

*Primary Examiner*—James D. Kallam
*Attorneys*—Oliver W. Hayes and Jerry Cohen

ABSTRACT: Electric capacitor comprising an electrode in powder or fabricated part form (e.g. wire or sheet) made of a ternary niobium-zirconium-titanium alloy with an oxide film on the electrode surface as capacitor dielectric. The alloy is selected as to composition and treated to produce and retain the Beta (body-centered cubic) phase. The resultant product affords high-capacitor stability and low leakage approaching the characteristics of the more expensive tantalum at a capacitance cost comparable to or better than that of niobium.

PATENTED AUG 3 1971 3,597,664
SHEET 3 OF 3
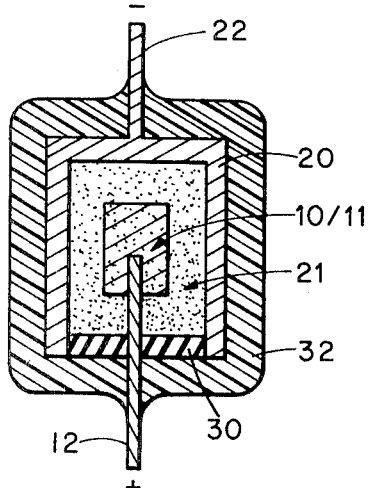
Fig. 6.
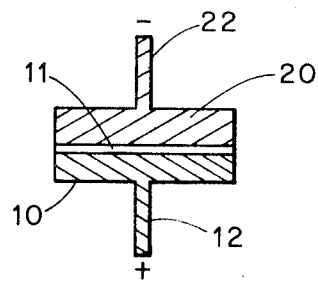
Fig. 7.
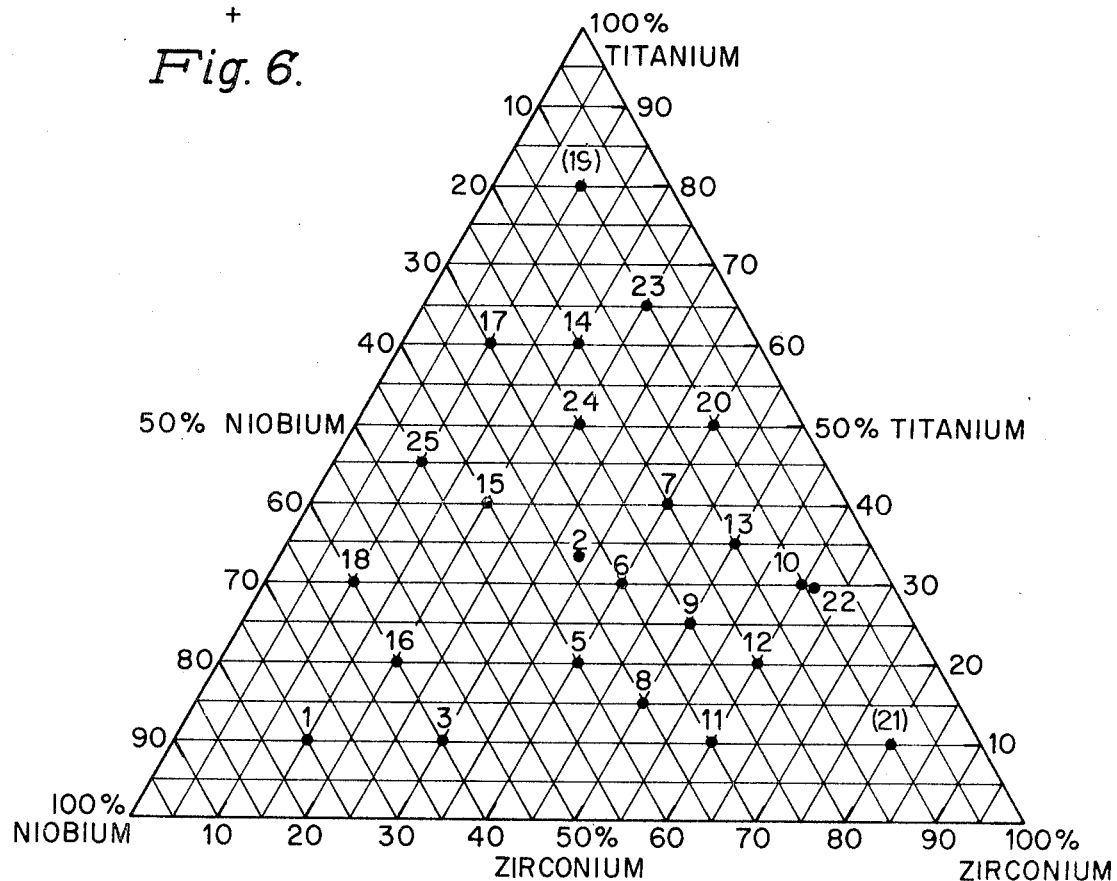
Fig. 8. — TERNARY COMPOSITION DIAGRAM (ATOMIC PERCENT)

3,597,664

NIOBIUM-ZIRCONIUM-TITANIUM CAPACITOR ELECTRODE

This invention relates to electric capacitors, particularly electrolytic capacitors and materials used in making them.

BACKGROUND

High-performance capacitors are utilized in a wide variety of radio, television, computer, telephone and other electric circuits. The principal high-performance material in the present state of the art is tantalum. It is a high-temperature, highly corrosion resistant metal capable of forming a highly stable oxide film, of high-dielectric constant, at its surface which serves as the capacitor dielectric.

With the current increased demand for tantalum and relative scarcity of world sources for tantalum ore, the need for a substitute has been of great importance to users of high-performance capacitors. The more abundant, less expensive, metal aluminum is a possible substitute. But it cannot be formed into porous slug type of capacitors as readily as tantalum. Furthermore, aluminum oxide has low-dielectric constant giving about one-third the capacitance of tantalum on an equivalent volume basis. Another obvious candidate as a tantalum substitute is niobium. Niobium oxide has a higher dielectric constant than tantalum and niobium metal can be produced at less cost. Niobium powders can also be utilized to produce porous slugs for electrolytic wet and dry capacitors. The United States Government and leading capacitor and materials manufacturers have therefore devoted intense research effort to niobium and its alloys (and also to titanium and zirconium alloys) to provide a tantalum substitute. The results of these efforts are reported in articles or reports located at:

a. Journal of the Electrochemical Society: vol. 108, pp. 343, 750, 1,023; vol. 100, p. 69; vol. 110, p. 1,277; vol. 111, p. 1,331; vol. 113, pp. 100, 1,048 (see also vol. 114, p. 145)
b. Journal of Electrochemical Technology: vol. 1, p. 93; vol. 2
c. Government Contract Reports: AD618055, AD431898
d. U.S. Pat. Nos. 3,126,503; 3,278,344; 3,321,677 (niobium-zirconium-titanium alloys) 3,203,793
e. Canadian Pat. No. 709,982

None of the work has produced a tantalum substitute which is in wide use at the present time although some of the resultant products were in commercial use for a time.

It has been apparent from the above published work that wet and solid electrolytic niobium capacitors are not as good as tantalum electrolytic capacitors in respect of leakage, capacitance and dissipation stability, especially at elevated temperatures.

Niobium can nevertheless be used for low capacitance-voltage ratings and alloyed with tantalum for use at higher capacitance-voltage ratings but cannot provide the desired substitute for tantalum for substantially all purposes, including cost.

OBJECT

It is the object of the present invention to solve the problem of providing a substitute capacitor material satisfying the purposes of the substantially unsuccessful development campaign of the prior art.

GENERAL DESCRIPTION

As in the prior art, the inventive effort is focused on the material which comprises the principal electrode of the capacitor (generally anode) and forms a surface oxide which serves as capacitor dielectric.

First, if it is assumed that high leakage and low-breakdown voltages of niobium (in the absence of gross impurities) are a result of damage inflicted by locally high temperatures and currents, it would be necessary to reduce these and this is possible through alloying niobium with a metal which forms a more refractory oxide. Young's book, Anodic Oxide Films (Academic Press 1961) indicates an inverse relationship between dielectric constant and ionic conduction of anodic oxide films. A condition for alloying agent candidates is that the alloying agent must have a solid solubility in niobium— which is true of the Group IVB, VB, VIB refractory metals. Zirconium gives the optimum balance of cost, stability of oxide, solubility. An alloy of niobium—50 atomic percent zirconium when fabricated to a sheet form anode and incorporated in a capacitor (anodized in .01 percent phosphoric acid to 200 v. at 25° C.) has good leakage and exhibits a change in capacitance on heating to 300° C. in air for 30 minutes of less than 10 percent, whereas a niobium capacitor changes by 100 percent.

However, it was discovered that when porous anodes are made from a powder form alloy of niobium-50 zirconium, they will not anodize above 100 v. and that they exhibit high leakage. Difficulty was also encountered in anodizing in that the alloy did not anodize well in aqueous electrolytes and organic electrolytes were too viscous for use in a porous structure.

Photomicrographs of Nb-50 AT. percent Zr anodes revealed a two phase metallurgical structure of Zr and Nb rich compositions within the porous anode, apparently resulting from the high-oxygen contents and high-surface area inherently obtained in powdered materials—both of which tend to promote instability of a single-phase, high-temperature structure. It was then conceived to stabilize the beta phase as a new approach to the problem and utilize a third alloy addition for this purpose.

Titanium was chosen because it forms a larger solid solution range with niobium than does zirconium and also lowers the beta and alpha transitions of niobium-zirconium so that the high-temperature beta phase could be retained by rapid cooling to lower temperatures. Titanium was also intended to render the overall alloy more readily anodized in aqueous solutions.

It has been found, surprisingly, that the best alloys for porous capacitor anode purposes are formed when the niobium and titanium are present in the alloy in substantially equal atomic amounts, and with a greater portion of zirconium than niobium or titanium. It is also necessary to avoid the titanium-rich and zirconium-rich portions of the ternary alloy system. Some niobium-zirconium rich portions of the portion must also be avoided. For these reasons it is important to maintain a single, crystalline structure of controllable composition.

Some care in material processing, as described below, is a necessary adjunct to material selection in order to achieve the Beta, single-phase crystalline structure in the product.

"Beta" is the name applied to various body centered cubic phases of the niobium-zirconium-titanium ternary alloy system. For purposes of the present invention, it doesn't matter which of the body-centered cubic phases is produced and maintained. But only a single one of such phases must be produced and maintained.

Figure 1A:
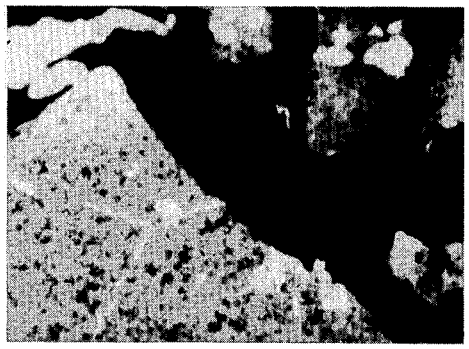
Figure 1B:
Figure 1C:
Figure 2:
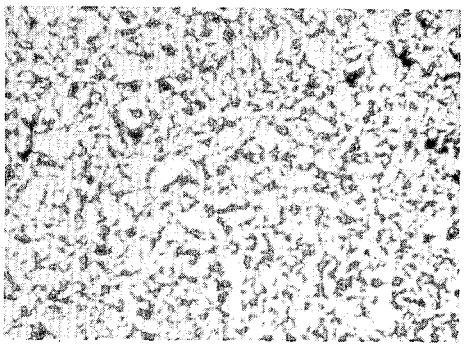
Figure 4:
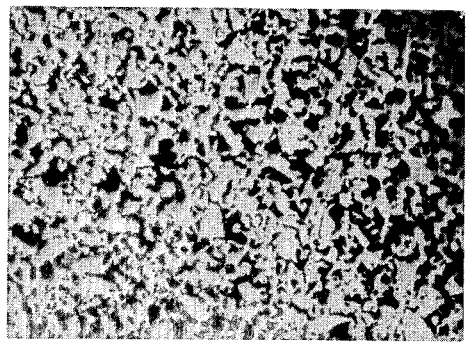
Figure 3:
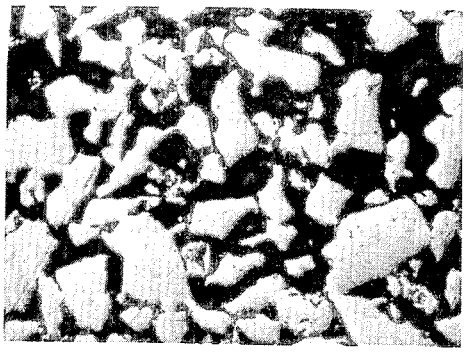
Figure 5:
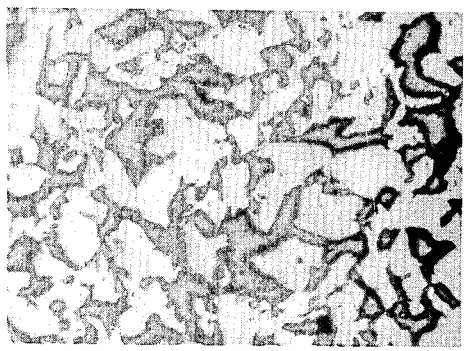

Other objects, features and advantages will in part be obvious from this disclosure and will in part be set forth hereinafter in this disclosure in the following specific description which is set forth with reference to the accompanying drawings in which:

FIGS. 1—5 are microphotographs of sectioned anodes made of compositions and including, by contrast, FIGS. 1A—1C showing anodes of other compositions, FIGS. 6—7 are schematic cross section views of capacitors utilizing the invention, and FIG. 8 is a ternary phase diagram of the niobium-zirconium-titanium system showing data points used in the examples.

The practice and relative value of the invention is illustrated by the following nonlimiting examples (including some specimens outside the invention scope).

EXAMPLE 1

Several alloys of nominal compositions listed in tables 1—3 below were made by arc melting 50—100 gram alloy buttons in argon atmosphere using a nonconsumable tungsten electrode. The buttons were formed from niobium chips and crystal bar zirconium and titanium with raw material specification as in example 2 (below). Each alloy button was melted four times and then heated to about 80 percent of the melting point and held at that temperature for 2 hours. The buttons were then sliced with a diamond wheel saw. One slice of each button was chemically analyzed and the remainder were cold rolled from three-sixteenths inch to a thickness of about 0.015 inch. The rolled sheets were cut into panels, degreased, chemically polished, rinsed and annealed above 1000° C. at about 80 percent of their respective melting points for 30 minutes in a vacuum of about $10^{15}$ torr. The panels were anodized at 1 ma. cm.$^2$ of surface in 0.01 percent $H_3PO_4$ (at 25° C. in one test and at 92° C. in a second test) to 200 v. and held for 30 minutes. The anodized panels were rinsed and dried and electrically tested in a wet cell (1 percent $H_3PO_4$ electrolyte) as formed and again after a later heat treatment of 300+ C. for 30 minutes in air.

The results are shown in table 1 for 25° C. anodization and in table 2 for 92° C. anodization where DCL is DC leakage in microamperes per square centimeter of anode surface tested, DF is dissipation factor (percent), C is capacitance in microfarads ($\mu f.$) or millimicrofarads ($m\mu f.$) per square centimeter of tested anode surface and $\Delta C$ is capacitance change (percent) due to heat treatment.

$$((Cap. \text{ after} - Cap. \text{ before})) - 100)(Cap. \text{ before})$$

Microstructure of the heat-treated buttons was examined. In general the structures were equiaxed with subgrain boundaries and dislocation etch pits reminiscent of a strained body-centered cubic phase quenched from a high temperature. There was no evidence of second phase transformation except in data points 19 and 21; these had fine precipitated structures within the equiaxed structure.

The data points in tables 1—2 are grouped from lowest leakage to highest leakage. Table 3 shows a further series of experimental results indicating reproducibility of the table 2 data.

TABLE I

| Data point | Nominal composition Nb-Zr-Ti (at. percent) | DCL | DF | Capacitance muf./cm.² | ΔC percent |
|---|---|---|---|---|---|
| 24 | 25-25-50 | <.02 | 1.6 | 56 | 70 |
| 9 | 25-50-25 | <.02 | 1.7 | 52 | 30 |
| 23 | 10-25-65 | .02 | 1.8 | 53 | 36 |
| 7 | 20-40-40 | .02 | 2.0 | 52 | 81 |
| 12 | 20-60-20 | .02 | 2.1 | 59 | 9.3 |
| 11 | 30-60-10 | .04 | 1.7 | 44 | 3.9 |
| 14 | 20-20-60 | .03 | 2.0 | 55 | 88 |
| 15 | 40-20-40 | .05 | 1.9 | 56 | 86 |
| 6 | 30-40-30 | .05 | 1.7 | 55 | 74 |
| 2 | 33.3-33.3-33.3 | .11 | 2.0 | 55 | 6.7 |
| 17 | 30-10-60 | .08 | 4.5 | 61 | 86 |
| 25 | 45-10-45 | .12 | 3.6 | 101 | 152 |
| 8 | 35-50-15 | .30 | 1.4 | 35 | 1.2 |
| 18 | 60-10-30 | .33 | 2.4 | 64 | 128 |
| 16 | 60-20-20 | .53 | 3.1 | 59 | 78 |
| 10 | 10-60-30 | .58 | 2.3 | 50 | 29 |
| 13 | 15-50-35 | .63 | 2.6 | 48 | 61 |
| 1 | 75-15-10 | 1.6 | 7.6 | | |
| 5 | 40-40-20 | 3.3 | 4.6 | | |
| 3 | 60-30-10 | 4.5 | 6.8 | | |
| 22 | 10-60-30 | 17 | 5.8 | | |
| 20 | 10-40-50 | 46 | 7.2 | | |
| Niobium | | .06 | 2.5 | 78 | 72 |
| Tantalum | | <.02 | 2.1 | 68 | 3.0 |

TABLE II

| Data point | Nominal composition Nb-Zr-Ti (at. percent) | DCL | DF | Capacitance muf./cm.² | ΔC percent |
|---|---|---|---|---|---|
| 9 | 25-50-25 | .02 | 1.2 | 54 | 0.3 |
| 12 | 20-60-20 | .02 | 1.5 | 54 | 39 |
| 13 | 15-50-35 | .02 | 1.7 | 49 | 38 |
| 2 | 33-33-33 | .02 | 1.5 | 41 | 74 |
| 6 | 30-40-30 | .02 | 2.1 | 45 | 0.7 |
| 22 | 10-60-30 | .02 | 2.2 | 54 | 88 |
| 10 | 10-60-30 | .06 | 2.5 | 56 | 31 |
| 24 | 25-25-50 | .14 | 2.2 | 44 | 30 |
| 5 | 40-40-20 | .09 | 1.5 | 34 | 0.5 |
| 16 | 60-20-20 | .04 | 1.6 | 48 | 94 |
| 15 | 40-20-40 | .09 | 1.5 | 36 | 110 |
| 1 | 75-15-10 | .06 | 3.4 | 56 | 105 |
| 25 | 45-10-45 | .13 | 3.1 | 81 | 181 |
| 18 | 60-10-30 | .33 | 1.7 | 56 | 172 |
| 17 | 30-10-60 | 2.1 | 2.2 | 47 | 91 |
| 11 | 30-60-10 | 7.4 | 4.4 | | |
| 7 | 20-40-40 | 9.5 | 7.5 | | |
| 3 | 60-30-10 | 22 | 5.0 | | |
| 14 | 20-20-60 | 37 | 11.2 | | |
| 23 | 10-25-65 | High | 5.7 | | |
| 8 | 35-50-15 | High | 10 | | |
| 20 | 10-40-50 | High | 13 | | |
| Tantalum | | .02 | 1.6 | 54 | 2.2 |
| Niobium | | High | (¹) | (¹) | (¹) |
| 19 | 10-10-80 | | | | |
| 21 | 10-80-10 | | | | |

¹ Will not anodize.

TABLE III

| Data point | Nominal composition Nb-Zr-Ti (at. percent) | DCL | DF | Capacitance muf./cm.² | ΔC percent |
|---|---|---|---|---|---|
| 2-1 | 33.3-33.3-33.3 | <.02 | 1.5 | 41 | 74 |
| 2-2 | 33.3-33.3-33.3 | .02 | 1.6 | 46 | 96 |
| 2-3 | 33.3-33.3-33.3 | .02 | 1.6 | 45 | 120 |
| 2-4 | 33.3-33.3-33.3 | .03 | 1.8 | 48 | 44 |
| 2-5 | 33.3-33.3-33.3 | .02 | 1.8 | 43 | 50 |
| 5-1 | 40-40-20 | .09 | 1.5 | 34 | 0.5 |
| 5-2 | 40-40-20 | .17 | 1.3 | 36 | 0.0 |
| 5-3 | 40-40-20 | .04 | 1.4 | 36 | 1.0 |
| 6-1 | 30-40-30 | .02 | 2.1 | 45 | 0.7 |
| 6-2 | 30-40-30 | .02 | 2.1 | 50 | 29 |
| 6-3 | 30-40-30 | .02 | 2.0 | 49 | 1.3 |
| 7-1 | 20-40-40 | 9.5 | | | |
| 7-2 | 20-40-40 | 12 | | | |
| 7-3 | 20-40-40 | 5.8 | | | |
| 9-1 | 25-50-25 | <0.2 | 1.2 | 54 | 0.3 |
| 9-2 | 25-50-25 | .02 | 1.9 | 52 | 7.8 |
| 9-3 | 25-50-25 | <0.2 | 1.4 | 54 | 8.2 |
| 10-1 | 10-60-30 | .06 | 2.5 | 56 | 31 |
| 10-2 | 10-60-30 | .06 | 2.1 | 48 | 194 |
| 10-3 | 10-60-30 | .02 | 2.0 | 54 | 152 |
| 22-1 | 10-60-30 | .02 | 2.2 | 54 | 88 |
| 22-2 | | .03 | 2.3 | 50 | 90 |
| 12-1 | 20-60-20 | <.02 | 1.5 | 54 | 39 |
| 12-2 | 20-60-20 | <.02 | 1.5 | 56 | 40 |
| 12-3 | 20-60-20 | .02 | 1.6 | 56 | 41 |
| 15-1 | 40-20-40 | .09 | 1.5 | 36 | 110 |
| 15-2 | 40-20-40 | .08 | 1.6 | 46 | 14 |
| 15-3 | 40-20-40 | .04 | 1.6 | 46 | −44 |
| 16-1 | 60-20-20 | .04 | 1.6 | 48 | 94 |
| 16-2 | 60-20-20 | .02 | 1.8 | 42 | 107 |
| 16-3 | 60-20-20 | .16 | 2.2 | 39 | 118 |
| 24-1 | 25-25-50 | .14 | 2.2 | 44 | 30 |
| 24-2 | 25-25-50 | .29 | 2.3 | 44 | 198 |
| 24-3 | 25-25-50 | 5.7 | | | |

EXAMPLE 2

Several alloy ingots were formed by melting together niobium, zirconium and titanium with the following purities:

| Nb | (machining chips) | 99.94% |
|---|---|---|
| Zr | (crystal bar) | 99.91% |
| Ti | (crystal bar) | 99.94% |

The nominal compositions of the alloys are given in table 4. The ingots were hydrided, ground to powder and dehydrided. The powders in varying size cuts were sintered above 1000° C. into porous compacts of approximately 1 g. each, cooled and anodized in 0.01 percent $H_3PO_4$ electrolyte at 92° C. temperature with a current density of 63 ma. per anode to a formation voltage for 2 hours. As a control, niobium anodes were similarly formed at 25° C. at current density of 50 ma. per anode.

The anodized compacts were impregnated with manganese nitrate and pyrolyzed to form manganese dioxide electrolyte. The pyrolysis temperature was 257° C. for 8 minutes. Three impregnation dips followed by pyrolysis were used. Dip time was 3 minutes. After $MnO_2$ impregnation, the anode (anodic oxide film) was reformed at 2 v./min. in the 0.01 percent $H_3PO_4$ at 92° C. to breakdown. The reformation breakdown is given in table 4 as $V_R$. A counterelectrode was added.

Similar capacitor samples were reformed to 35 v. and tested at 20 v. for capacitance and leakage. The results are given in table 4.

TABLE 4

| Data point | Nominal atomic percent composition (Nb-Zr-Ti) | Powder size [1] / sinter temp. (°C.) | $V_R$ volts | Capacitance, (μfd.) | L/C, μ amp./μfd. |
|---|---|---|---|---|---|
| 2-1 | 33-33-33 | F/1,100 | 40 | 23.3 | .39 |
| 2-2 | 33-33-33 | F/1,200 | 40 | 16.5 | .07 |
| 2-3 | 33-33-33 | F/1,300 | 40 | 12.4 | .51 |
| 2-4 | 33-33-33 | C/1,300 | 40 | 5.3 | .26 |
| 5 | 40-40-40 | F/1,300 | 65 | 11.7 | .22 |
| 6-1 | 30-40-30 | F/1,200 | 47 | 12.0 | .17 |
| 6-2 | 30-40-30 | C/1,200 | 47 | 5.4 | 2.3 |
| 6-3 | 30-40-30 | C/1,300 | 52 | 4.8 | .35 |
| 6-4 | 30-40-30 | C/1,100 |  | 18.0 | .08 |
| 9-1 | 25-50-25 | F/1,200 | 40 | 8.6 | .14 |
| 9-2 | 25-50-25 | F/1,200 | 63 | 8.9 | .06 |
| 9-3 | 25-50-25 | C/1,300 | 38 | 4.4 | .11 |
| 9-4 | 25-50-25 | C/1,300 | 65 | 4.4 | .05 |
| 12-1 | 20-60-20 | F/1,100 | 80 | 7.8 | .06 |
| 12-2 | 20-60-20 | C/1,200 | 62 | 4.5 | .13 |
| 12-3 | 20-60-20 | C/1,300 | 62 | 4.5 | .13 |
| 13 | 15-50-25 | F/1,100 | 63 | 14.2 | .09 |
| 15-1 | 40-20-40 | F/1,100 | 55 | 11.2 | 2.0 |
| 15-2 | 40-20-40 | C/1,200 | 58 | 9.9 | 1.6 |
| 15-3 | 40-20-40 | C/1,300 | 42 | 4.7 | 2.5 |
| 16-1 | 60-20-20 | F/1,300 | 58 | 15.4 |  |
| 16-2 | 60-20-20 | C/1,400 | 58 | 5.8 | 1.1 |
| 22 | 10-60-30 | F/1,100 | 65 | 13.1 | .31 |
| 24 | 25-25-50 | F/1,200 | 67 | 11.5 | .65 |
| Control | 100-0-0 | A/2,050 | [2] 85 | 15.3 | .10 |

[1] F cut is −325 mesh +5 micron; C cut is −100 mesh −325 mesh; A cut is −140 mesh +5 microns F.A.P.D.
[2] 25° C. Test for 100-0-0, 85° for others.

Solid capacitor samples of compositions noted in table 5 and −325 mesh powder size were put through life tests of 200 to 1,000 hours and life test data 13 charted in table 5. In the lift tests, leakage currents capacitance and dissipation factor are measured at 25° C. Then the temperature is raised to 85° C. and the capacitors retested. Temperature is held at 85° C. for an extended period, the capacitors retested and then the temperature is dropped to 25° C. for retest. Initial (I) and final (F) values of these parameters are shown in table 5. In some instances the "final" value at high temperature is a median or average value.

EXAMPLE 3

Solid electrolytic capacitors were prepared as in example 2 using the alloy compositions identified as 6, 12 and 16 in table 5. Specific anode sintering and dielectric oxide formation conditions are given in table 6 A.

These capacitors were tested for electrical properties at room temperatures and then life tested at 85° C. under 20 v. bias for 1,000 hours. The results are given in table 6B.

The results were in agreement with those tabulated in table 5 except that composition 16 has improved leakage behavior. However, the alloy also exhibited capacity instability.

The life testing acted as a "burn-in" for capacitors, tending to stabilize them, for better performance in future life testing and would be a desirable step for capacitor production.

TABLE 6A
ANODE PROCESSING

| Number: | Weight, gm. | Green density, g./cc. | Sinter temp., °C. | Time, hr. |
|---|---|---|---|---|
| 6 | .734 | 3.90 | 1,100 | ½ |
| 12 | .722 | 3.80 | 1,100 | ½ |
| 16 | .823 | 4.31 | 1,300 | ½ |

FORMATION

Electrolyte: 0.01 percent $H_3PO_4$ at 92° C.

Current Density: 63 ma./anode.

Formation Voltage: 200 v.

Hold Time at Voltage: 2 Hours.

TABLE 5
INITIAL AND FINAL MEDIAN OR AVERAGE VALUES AT 25° C. AND 92° C.

| Data point | Nominal composition, at. percent, Nb-Zr-Ti | Leakage (microamps) | | | | Capacitance (μf.) | | | | Dissipation factor, percent | | | |
|---|---|---|---|---|---|---|---|---|---|---|---|---|---|
| | | $I_{25°}$ | $I_{85°}$ | $F_{85°}$ | $F_{25°}$ | $I_{25°}$ | $I_{85°}$ | $F_{85°}$ | $F_{25°}$ | $I_{25°}$ | $I_{85°}$ | $F_{85°}$ | $F_{25°}$ |
| 2 | 33.3-33.3-33.3 | [a] 6.3 | [a] 37 | [a] 38 | [a] 3.0 | 16.5 | 21.6 | 18.9 | 16.1 | 17.0 | 19.3 | 14.5 | 16.9 |
| 5 | 40-40-20 | 2.6 | .13 | 13 | 1.9 | 11.7 | 13.1 | 12.5 | 11.3 | 7.2 | 4.8 | 7.5 | 2.8 |
| 6 | 30-40-30 | 1.7 | 10 | 6.5 | 0.7 | 15.0 | 17.5 | 15.0 | 12.9 | 12.2 | 10.7 | 10.2 | 5.8 |
| 9 | 25-50-25 | 0.9 | 3.0 | 3.5 | 0.5 | 8.8 | 10.1 | 9.9 | 8.3 | 7.3 | 5.8 | 7.2 | 3.3 |
| 12 | 20-60-20 | 0.5 | 3.5 | 2.0 |  | 7.8 | 8.7 | 8.2 |  | 4.0 | 7.3 | 6.0 |  |
| 13 | 15-50-25 | 1.2 | 7.2 | 9.1 | 1.5 | 14.2 | 15.7 | 14.4 | 11.2 | 10.3 |  | 9.2 | 3.2 |
| 15 | 40-20-40 | [b] 19.0 | [b] 55 | [b] 49 |  | 10.5 | 15.0 | 11.4 |  | 21.0 | 21.0 | 15.5 |  |
| 16 | 60-20-20 | [c] 0.4 | [c] 2.2 | [c] 3.8 |  | 15.4 | 19.3 | 17.8 |  | 22.0 | 18.0 | 13.3 |  |
| 22 | 10-60-30 | 4.1 | 24 | 75 | 9.0 | 13.1 | 15.3 | 10.9 | 9.3 | 8.0 | 5.8 | 8.4 | 2.6 |
| 24 | 25-25-50 | 7.5 | 23 | 37 | 7.9 | 11.5 | 13.4 | 12.4 | 8.1 | 17.0 | 8.1 | 12.1 | 3.9 |
| Niobium | [d]100-0-0 | 1.6 | 2.4 | 4.4 |  | 15.3 | 17.5 | 15.0 |  | 15.0 | 16.0 | 25.0 |  |

[a] 1 of 9 samples tested at data point 2 was a failure.
[b] 1 failure out of 4 samples tested at data point 15.
[c] 2 failures out of 3 samples tested at data point 16.
[d] Leakage in rising to the milliampere range.

TABLE 6B

| Composition Number | Life test, hours | Temp. (°C.) | L (μa./anode, med.) | C (μf./anode, avg.) | L/C (μa./μf.) | DF (percent) |
|---|---|---|---|---|---|---|
| 6 | 0 | 25 | .50 | 7.6 | .066 | 6.1 |
|  | 0 | 85 | 2.4 | 9.2 | .26 | 8.2 |
|  | 100 | 85 | .94 | 8.4 | .11 | 7.8 |
|  | 250 | 85 | .92 | 8.2 | .11 | 6.6 |
|  | 500 | 85 | .96 | 7.8 | .12 | 6.0 |
|  | 750 | 85 | 1.20 | 7.8 | .15 | 6.2 |
|  | 1,000 | 85 | 1.30 | 7.7 | .17 | 6.1 |
|  |  | 25 | .37 | 7.1 | .052 | 4.2 |
| 12 | 0 | 25 | 1.1 | 10.1 | .11 | 8.8 |
|  | 0 | 85 | 9.2 | 12.2 | .75 | 8.6 |
|  | 100 | 85 | 4.3 | 10.9 | .39 | 9.9 |
|  | 250 | 85 | 4.7 | 10.9 | .43 | 10.2 |
|  | 500 | 85 | 6.1 | 10.3 | .59 | 9.1 |
|  | 750 | 85 | 6.4 | 10.3 | .62 | 8.7 |
|  | 1,000 | 85 | 6.6 | 10.3 | .64 | 8.4 |
|  |  | 25 | .92 | 9.0 | .10 | 6.5 |
| 16 | 0 | 25 | .63 | 17.4 | .036 | 11.8 |
|  | 0 | 85 | 3.6 | 23.1 | .16 | 10.5 |
|  | 100 | 85 | 3.2 | 20.6 | .16 | 11.9 |
|  | 250 | 85 | 3.0 | 19.5 | .15 | 9.3 |
|  | 500 | 85 | 3.9 | 18.1 | .22 | 7.3 |
|  | 750 | 85 | 4.0 | 17.6 | .23 | 7.3 |
|  | 1,000 | 85 | 4.3 | 17.4 | .25 | 6.8 |
|  |  | 25 | .66 | 15.5 | .043 | 8.8 |

Since the anodic film is formed from the alloy, the film's properties are dependent upon the alloy composition. Alloys rich in niobium, titanium, or zirconium do not form coherent or thermally stable anodic films. Alloys containing 20 to 60 percent Nb, Zr, or Ti are better but they tend to decompose into two or three crystalline forms with an accompanying change in chemical composition towards the niobium, zirconium, and titanium rich portion of the ternary system, with resulting poor anodic film properties. For these reasons, it is important that the alloy remain as a single, crystalline structure of constant composition, preferably a single solid solution, Beta (body centered cubic) phase. Complete Beta phase, solid solution only occurs at temperatures above about 1,000° C. It is therefore necessary to homogenize this alloy above this temperature and cool it with sufficient rapidity to retain the high-temperature, Beta phase structure. Some compositions, notably the Nb-Zr rich regions, are highly unstable and rapidly form second phases on cooling. The addition of titanium not only lowers the phase transition temperature but extends the solid solubility range and readily promotes the retention of the high-temperature Beta phase during cooling.

It can be seen from the tables that most of the alloy compositions can produce 200 v. anodic films, useful as capacitor devices. Preferred alloy compositions are characterized by low leakage and a low-capacitance change ($\Delta C$) on thermal treatment. These alloys would be useful for elevated temperature use. They normally contain 20—40 percent Nb, 30—60 percent Zr, and 20—40 percent Ti.

Best results occur when the niobium and titanium are in substantially equal atomic concentrations (within 10 percent of the total).

From life test data of porous anode, solid electrolyte capacitors in table 5, it is obvious that essentially all of the compositions and essentially the whole system (i.e. 20—80 percent Nb, 20—80 percent Zr, 20—80 percent Ti) are capable of being fabricated into useful capacitors. However, some compositions, namely those stated above, give low leakage and good stability and are to be preferred over the others.

FIG. 1 is a cross section photomicrograph of niobium-zirconium-titanium alloy of the composition corresponding to data point 15 in example 2, in sintered powder form. The magnification of the photo is 800 times. FIGS. 1A—1C show (at 800 times also) niobium-50 percent zirconium powder sintered at 1,300° C., 1,400° C. and 1,500° C. respectively.

FIGS. 2, 3, 4, 5 show sectioned capacitor anodes of atomic compositions and powder sizes as follows:

| FIG. | Composition (Nb-Zr-Ti) | Starting Powder Size |
| --- | --- | --- |
| 2 | 30–40–30 | –325 mesh +5 microns |
| 3 | 30–40–30 | –60 mesh +325 mesh |
| 4 | 20–60–20 | –325 mesh +5 microns |
| 5 | 20–60–20 | –60 mesh +325 mesh |

All magnifications are 100 times in FIGS. 2—5.

The niobium-zirconium-titanium alloys shown in FIGS. 1—5 have no second phase. A precipitated second phase is quite apparent in FIGS. 1A, 1B, 1C. In general, a deleterious second phase, if produced, will be visible at 100 times optical magnification and can be regarded as undesired if observed at as low as 100 times magnification.

The production of the requisite single-phase crystalline structure can be accomplished (a) in-situ in the electrode (during capacitor production or prior to capacitor production) or (b) in the production of starting materials to be used later in electrode production. In either case what is involved is raising the alloy composition material to a high enough temperature as in sintering powder or annealing sheet to produce, as a homogenous solid solution, the single-Beta phase high-temperature modification of the alloy structure and to bring it to equilibrium, then cooling with sufficient rapidity to maintain the Beta structure essentially free of any second phase observable at 800 times magnification.

A typical cooling schedule for purposes of the invention would be from 1,300° C. to 300° C. in 20 minutes and achieved by continuous movement of parts from a furnace to a cooling zone, as by a conveyor belt.

FIGS. 6—7 show two examples of capacitors utilizing the present invention. Each of the capacitors comprises an anode 10 with a dielectric comprising at least in part a dielectric oxide film on the surface of the anode material. The capacitors also comprise a cathode electrode 20. Leads 12, 22 are attached to anode 10 and cathode 22 respectively. In FIG 6, the anode has the form of a sintered powder slug and the capacitor is of the electrolytic type with wet or solid electrolyte 21 impregnating the anode and extending to the cathode. FIG. 6 also shows conventional capacitor packaging elements as a seal 30 and plastic encapsulant 32. The anode 10 in the FIG. 7 capacitor is a rolled foil or a film sputtered from a sputtering target and includes a dielectric oxide film 11 on the anode surface.

The invention can also be utilized in nonpolar capacitors, as well as the polar capacitors of FIGS. 6—7, and in other electrical, chemical and electrochemical devices requiring the significant characteristics of a tantalum substitute material as described herein.

FIG. 8 is a ternary diagram showing the various data points referred to in the above examples. The percentages on the three sides of the diagram are atomic percentages.

The compositions indicated are based on proportions of starting materials used. At any given location in a powder or other product produced from the starting materials by melting together, the composition may vary due to the known metallurgical phenomenon of coring as the melt is cooled. Generally, the compositional differences found along the material on a microscopic scale are acceptable. However it is preferable to minimize compositional variation due to coring during ingot solidification and this can be accomplished by homogenization heat treatment applied either as an additional step immediately after melting and cooling the alloy and/or in the course of the fabrication steps (e.g. sintering powder or annealing foil), as noted above.

While the present invention has been described with reference to particular embodiments thereof, it will be understood from the above disclosure by those skilled in the art that numerous modifications may be made without actually departing from the scope of the invention. For instance, the alloys may include substantial impurity metals (e.g. up to 3 percent hafnium added in some grades of commercial zirconium). Therefore the appended claims are intended to cover all such equivalents or variations as come within the true spirit of the invention.

I claim:

1. A porous high-surface area electrode for an electrolytic device comprising a porous body of sintered powder of a film-forming ternary alloy of niobium, zirconium and titanium, the alloy having an essentially homogeneous crystal structure of single-Beta phase, and a surface layer of oxide of the alloy on the electrode.

2. The electrode of claim 1 wherein the elements of the alloy are present in atomic percentages of from:

20 percent to 40 percent for niobium 30 percent to 60 percent for zirconium 20 percent to 40 percent for titanium 3. The electrode of claim 2 wherein the niobium and titanium are present in the alloy in substantially equal atomic amounts.

4. An electrode body for an electrolytic capacitor electrode comprising a metal alloy of niobium, zirconium and titanium, the alloy having an essentially homogeneous crystal structure of a single body-centered cubic phase.

5. Method of making a valve metal electrode of an electrical translating device comprising mixing niobium, zirconium and titanium and melting them together to produce a ternary alloy thereof and forming the material into an electrode body, the alloy in the finished electrode having an essentially homogeneous crystal structure of single body-centered cubic phase.

6. The method of claim 5 including steps of heating at least equivalent to heating to 1,000° C. for 30 min. and forming the homogeneous single phase crystal structure of the electrode material in-situ during the heating and subsequent cool down.

7. The method of claim 6 wherein the material is in powder form and the electrode heating step comprises sintering the powder into a porous body.

8. The method of claim 5 including forming the homogeneous single phase crystal structure in the material prior to forming the electrode and retaining the crystal structure in the electrode fabrication.

9. An electrical capacitor including:
a. a high-surface area electrode comprising a porous body of sintered niobium, zirconium and titanium ternary alloy,
a'. the alloy having an essentially homogeneous crystal structure of single body-centered cubic phase,
a". a surface layer of oxide of the alloy on the surface of the electrode,
b. an electrolyte medium filling pores of the said electrode,
c. a counterelectrode electrically connected to said electrolyte.

10. An electrical capacitor including:
a. an electrode comprising a body of a ternary alloy of niobium, zirconium and titanium,
a'. the alloy having an essentially homogeneous crystal structure of single-Beta phase,
b. a dielectric formed on the surface of said electrode,
c. a counterelectrode on said dielectric.